United States Patent [19]

Schill

[11] Patent Number: 5,503,593
[45] Date of Patent: Apr. 2, 1996

[54] METHOD AND APPARATUS FOR SKINNING AND TRIMMING A PRODUCT TO BE TREATED

[75] Inventor: Alfred Schill, Kehl, Germany

[73] Assignee: Maja-Maschinenfabrik Hermann Schill GmbH, Kehl-Goldscheuer, Germany

[21] Appl. No.: 132,988

[22] Filed: Oct. 7, 1993

[30] Foreign Application Priority Data

| Oct. 7, 1992 | [DE] | Germany | 42 33 723.2 |
| Jul. 6, 1993 | [DE] | Germany | 43 22 478.4 |
| Jul. 6, 1993 | [EP] | European Pat. Off. | 93110809 |

[51] Int. Cl.⁶ .................................................. A22C 17/12
[52] U.S. Cl. .................................................. 452/127; 452/130
[58] Field of Search ....................... 452/127, 130, 452/125, 128; 99/584, 589

[56] References Cited

U.S. PATENT DOCUMENTS

| 4,250,594 | 2/1981 | Mitchell | 452/127 |
| 4,466,344 | 8/1984 | Schill | 452/127 |
| 5,236,323 | 8/1993 | Long et al. | 452/127 |

*Primary Examiner*—Willis Little
*Attorney, Agent, or Firm*—Edwin E. Greigg; Ronald E. Greigg

[57] ABSTRACT

A method and an apparatus for skinning and trimming a product to be treated, in which the product to be treated is delivered on a delivery device to a cutting unit. The cutting unit is embodied as a cutting blade and is associated with a traction roller. A linear rotary device is received by a retaining device and is disposed adjacent the cutting unit. In an operating position, the rotary device engages the product to be treated and sets it into rotation, to enable skinning in the circumferential direction of the product to be treated. After the skinning operation, either the rotary device is transferred to a discharge position and the product to be treated is removed from the apparatus via a discharge device or the delivery device is retracted so that the product being treated can drop downward. Another option for discharge of the product for treatment after the skinning operation is for the product being treated to be removed from the processing position laterally by an arm.

12 Claims, 7 Drawing Sheets

METHOD AND APPARATUS FOR SKINNING AND TRIMMING A PRODUCT TO BE TREATED

BACKGROUND OF THE INVENTION

The invention relates to a method and an apparatus for skinning and trimming a product to be treated, in particular pieces of meat, fish or the like.

From the known German Patent 30 20 351, a skinning machine is disclosed in which a pressure roller acting as a pressure device is supported on a roller support that has a pair of double rocker arms. The rocker arms are formed from the long sides of a hood that covers the delivery device and are supported on the machine frame with a further pair of rocker arms. The product to be trimmed can thus differ in its thickness or size; as a result of the rocker arm arrangement the pressure roller can press the product to be trimmed in the desired manner in the conveyor belt in accordance with the restoring forces engaging the pressure roller.

When the apparatus is charged with a product to be handled that is of some form other than flat, an example being generally round or cylindrical bodies, such as haunches, pieces of meat, pieces of fish or the like, only a small tangential portion of the product to be treated can be skinned.

The skinning must be done manually. This is done either by using a knife or by a manually actuatable skinning machine. These methods are extremely dangerous. They can cause injuries to the hand as well as problems with the wrist bones and carpal tunnel syndrome.

ADVANTAGES OF THE INVENTION

The method according to the invention has the advantage over the prior art of skinning and trimming, of a product to be treated, that is done in the circumferential direction. As a result, the product to be treated, in particular meat or fish pieces or the like, which deviate from a flat body shape, can be handled equally automatically without requiring manual work afterward. The product to be treated is thus essentially in engagement with the cutting unit over the entire circumferential surface, so that after at least one revolution of the product, the processing operation can be concluded. The duration of the processing time, the number of revolutions, and the rotational speed of the product to be treated affect the amount of the material to be skinned and trimmed. This amount is also determined by the adjustment of the spacing between the cutting unit and the traction roller.

A further advantage of the invention is that the product to be treated is set into rotation by a rotary device. Thus the product can be rotated about an axis that extends substantially parallel to the traction roller and can be substantially maintained for treatment. This axis may essentially form a triangular arrangement with the axes of the traction roller and rotary device.

In an advantageous feature of the invention, the rotary device, preferably embodied as a linear unit, is positioned adjacent to the cutting unit. By the engagement of the traction roller with the underside of the product to be treated, the product undergoes an impulse in the transport direction, while the linear unit lends the product an impulse upward and substantially counter to the transport direction. The cooperation of these factors sets the product to be treated into rotation, and simultaneously it is guided by the traction roller past the cutting unit for skinning.

In another advantageous feature of the invention, the rotary device is moved in alternation from a working position to a discharge position. In the working position, the linear unit is positioned downstream of the traction roller in the transport direction, in order to move the product to be treated counter to the transport direction again during the cutting operation. The discharge position is located upstream of the traction roller in terms of the transport direction. The rotary device is guided to a discharge position and is disposed above or downstream of the product to be treated. The forces of the linear unit and traction roller that now engage the product to be treated act in the transport direction and can move the product to be treated past the cutting unit out of the skinning machine, so that the product can be guided past the cutting unit without additional pressure. At the same time it may be provided that the rotary device be moved in the transport direction as well during discharge of the product to be treated, with the speed of motion being less than that of the product.

In another advantageous feature of the invention, the delivery device for discharging the product to be treated is moved far enough counter to the transport direction that the product can drop downward between the cutting unit and the delivery device, and after that the delivery device returns to the outset position.

In another advantageous feature of the invention, the product to be treated is laterally moved for discharge out of its position at the cutting unit by an additional arm.

In another advantageous feature of the invention, a product to be treated, resting on the delivery device, is detected by a sensor element. As a function thereof, the rotary device is moved into a working position and driven counter to the transport direction. Moreover, the other process data for processing the product to be treated are reset for a new processing operation.

The apparatus according to the invention for performing the method has the advantage over the prior art of enabling complete processing of the product to be treated in one operation. A rotary device cooperating with the traction roller brings about the rotation of the product to be treated essentially in a plane that is parallel to the traction roller and the cutting unit. As a result, the product to be treated can be processed in its entire circumference by the cutting unit. Complete skinning can be done regardless of the shape of the body of the product to be treated. Thus pieces of fish, meat or the like of various sizes, types and shapes, can be processed on the automatic skinning apparatus.

In another advantageous feature of the invention, the delivery device for processes the product to be treated is disposed directly downstream of the cutting unit in terms of the transport device, and for discharging the product to be treated the delivery device is positioned such that a distance is present between the cutting unit and the delivery device that is greater than the dimensions of the product to be treated.

In another advantageous feature of the invention, an arm serving to discharge the product to be treated is mounted above, or in terms of the transport direction downstream of, the rotary apparatus and moves the product to be treated laterally out of its position at the cutting unit.

Another advantage of the invention is that the apparatus can likewise be used to process a generally flat product to be treated. The rotary device may have a force vector direction acting counter to the traction roller and may optionally at the same time hold down the product to be treated at the cutting unit for skinning purposes. However, it is provided in an upper position that is raised from the cutting device.

An advantageous feature of the invention is that the rotary device can be positioned in a working position and in a discharge position. In the working position, the rotary device is positioned adjacent to the cutting unit. Thus the cutting device can be located in and block the transport direction of the product to be treated. By means of the direction of rotation of the rotary device, the product to be treated is given an impulse that counteracts the transport direction. The product to be treated is thus set into rotation, and the rotary device is positioned such that a continuous skinning process can be made possible. In a discharge position, the rotary device is disposed above or downstream of the product to be treated, and reinforces the discharge of the product to be treated after the processing has been done.

In a further advantageous feature of the invention, the rotary device is received by a retaining device that can be positioned in a working position and a discharge position via at least one pair of rocker arms and a cylinder unit. The rocker arms are pivotably secured to the side faces of the basic frame and are pivotably joined to the retaining device. The retaining device can accordingly be movable horizontally in the transport direction. The cylinder units, which engage an opposite end of the retaining device and are likewise provided in pairs, enable a vertical deflection of the retaining device. The cooperation of these elements on the retaining device enable the variable positioning of the retaining device above all with respect to the vertical direction.

In a further feature of the invention, it is provided that the rotary device is formed as a pressure roller and may have a linear engagement edge that is intended to engage the product to be treated. An exertion of force on the product to be treated can thus be brought about in an effective direction that is essentially counter to the transport direction. This linear engagement edge may be provided by means of a shoulder on a cylindrical body or the like. In the preferred embodiment, an arrangement of vane-like wheels with vanes pointing radially outward is provided. They are oriented such that the outer ends of the vanes form a linear edge.

In a further advantageous feature, it is provided that the vane-like wheels have bent, resilient prongs on their ends. These act in vane-like fashion in a rotary direction corresponding to the traction roller. This enables better engagement of the product to be treated. In a discharge position, in which the direction of rotation is the reverse of that in the working position, the bent prongs can engage the product to be treated over a large surface area and can bring about a better compressive force to remove the product to be treated from the skinning apparatus. The vane wheels are advantageously formed of plastic or rubber, which meets the requirements for use in processing food products.

In a further advantageous feature of the invention, it is provided that one of the vane-like wheels is offset from the other vane wheels disposed on the rotary device. This may promote the rotation of the product to be treated, particularly in the case of an irregular shape. The product to be treated can thus be given a tangential impulse, and as a result the product can be changed in its position as delivered.

In a further advantageous feature of the invention, it is provided that the cutting unit is drivable regardless of the position of the rotary device relative to the cutting unit. The drive is effected via a drive device that is transferred from the basic frame via the rocket to the retaining device. The drive device is effected via drive chains but can also be brought about by a belt drive or the like.

In another advantageous feature of the invention, it is provided that the retaining device that receives the rotary device can be associated with the cutting unit independently of the basic frame. The skinning and trimming machine can be converted quickly and simply, or expanded with this component. The retaining device can be positioned relative to the cutting unit and can receive the rotary device in a self-supporting manner. Provision may also be made so that the retaining device can be mounted on the basic frame. By means of separable fastening elements, the retaining device with the basic frame of the skinning and trimming machine can be secured in a basic position relative to the cutting unit. The retaining device which is freely associatable may be equipped with its own drive, which may be embodied pneumatically, hydraulically or electrically, for controlling and regulating the rotary device. Coupling elements may also be provided, which can be connected to the drive unit of the skinning and trimming machine. This is especially advantageous in the case where rotary devices are mounted on the basic frame. This autonomous retaining device that receives the rotary device may be associated as needed with different skinning and trimming machines. The rotary and retaining device may also be embodied by a multi-axial robot with suitable gripper elements.

In another advantageous feature of the invention, the rotary device is embodied as a linear unit. This rotary device is interchangeably disposed on the retaining device. It may have a pneumatic, hydraulic and/or electric drive or the like. An engagement device can advantageously be mounted on this linear unit and has a front engagement edge for engagement with the product to be treated and for rotating the product to be treated. This engagement device is interchangeably secured to the linear unit, enabling easy conversion and adaptation to different products to be treated.

In another advantageous feature of the invention, it is provided that the linear unit is movable, in particular pivotable, on the retaining device in the working and discharge positions. Thus in addition to the working and discharge positions, the linear units can be positioned at an optimal positioning angle relative to the product to be treated, so that rotation of the product is assured. By way of example, the linear unit may be positioned in a position above the meat product. From this position, the linear unit can then be pivotable into a working position and into a discharge position, that the engagement device, in terms of the transport device, can engage downstream of the product on the one hand and upstream of the product, on the other. Moreover, the linear unit may be displaceable with final control elements or drive elements in different positions relative to the retaining device, so that the necessary position relative to the product to be treated becomes possible for both the working and discharge positions.

In another advantageous feature of the invention, it is provided that at least one linear unit is disposed so that its forward engagement edge can engage the product to be treated; the engagement device preferably has a hook-shaped course, in order to set the product to be treated into rotation and keep it that way. The linear units are triggered at staggered times to pass through the course, so that at least one engagement unit is always in engagement with the piece of meat. The engagement device may be embodied in the form of a bar or strip and may have the engagement edge on the lower end thereof. By disposing a plurality of engagement devices next to one another and by means of the staggered-time triggering, these drive devices produce a sinusoidal course. This course can additionally rotate the meat about a further deviating axis extending parallel to the traction axis, thereby assuring complete skinning and trimming.

In another advantageous feature of the invention, the engagement device is embodied in comblike fashion. The free ends of the teeth of the comb are in turn provided with the engagement edges. The meshing of at least two comblike engagement devices, which are contrary to one another in their motion, can likewise set the product to be treated into rotation.

In a further advantageous feature of the invention, a control unit is provided to control the skinning machine. This control unit regulates all the processes that are required to process a product to be treated. The control unit may control various parameters, such as the rotational speed of the pressure roller or drive parameters for the linear unit as well as the length of time the product to be treated is rotated at the cutting unit. Hence the amount of material to be skinned can be defined. This definition is also dependent on the setting of the distance between the cutting unit and the traction roller. In a working position, the rotary direction or direction of motion of the rotary device, the rotary speed, and the positioning of the retaining device relative to the traction roller are controlled by the control unit. Once the processing time has elapsed, the retaining device is transferred to a discharge position via the control unit. The cylinder units and rocker arms are actuated and the direction of action of the rotary device is reversed. Sensors may also be provided that trigger the cylinder units so that a requisite pressure is transmitted via the rotary device to the product to be treated, in order to enable a rapid discharge.

In another advantageous feature it is provided that a user service panel be connected to the control unit. As a result, the user can make an individual program setting in accordance with the particular product to be treated at a given time. At the same time, if any errors arise, the user can be informed via an error display on this user service panel. Provision may also be made for this user service panel to be portable, so that it can be programmed in preparation for work, for instance in an office. Remote polling about current operating data may also be provided. Provision may also be made so that the control unit receives all the operating data so as to make them ready for later evaluation.

Further advantages and advantageous features of the invention may be found in the ensuing description, drawing and claims.

DRAWINGS

An exemplary embodiment of the subject of the invention is shown in the drawings and described in further detail below. Shown are:

FIG. 1, a perspective view of a skinning apparatus;

FIG. 2, a schematic fragmentary view of the automatic skinning apparatus in a working position;

FIG. 3, a schematic fragmentary view of the automatic skinning apparatus in the discharge position;

FIG. 4, a side view of the automatic skinning apparatus with its drive connections;

FIG. 5, a view of the skinning apparatus from the rear with its drive motors;

FIG. 6, a further side view of the automatic skinning apparatus with a drive of a retaining device;

FIG. 7, a front view of the automatic skinning apparatus;

FIG. 8, a side view with a control and monitoring unit;

FIG. 9, the circuit diagram for controlling the automatic skinning apparatus;

FIG. 10 illustrates a side view of a skinning machine in which the skinned product is discharged upstream of the cutter; and FIG. 11 illustrates the feed belt moved away from the cutter so that the skinned product is discharged between the cutter and the feed belt.

DESCRIPTION OF THE EXEMPLARY EMBODIMENT

Figure 1:
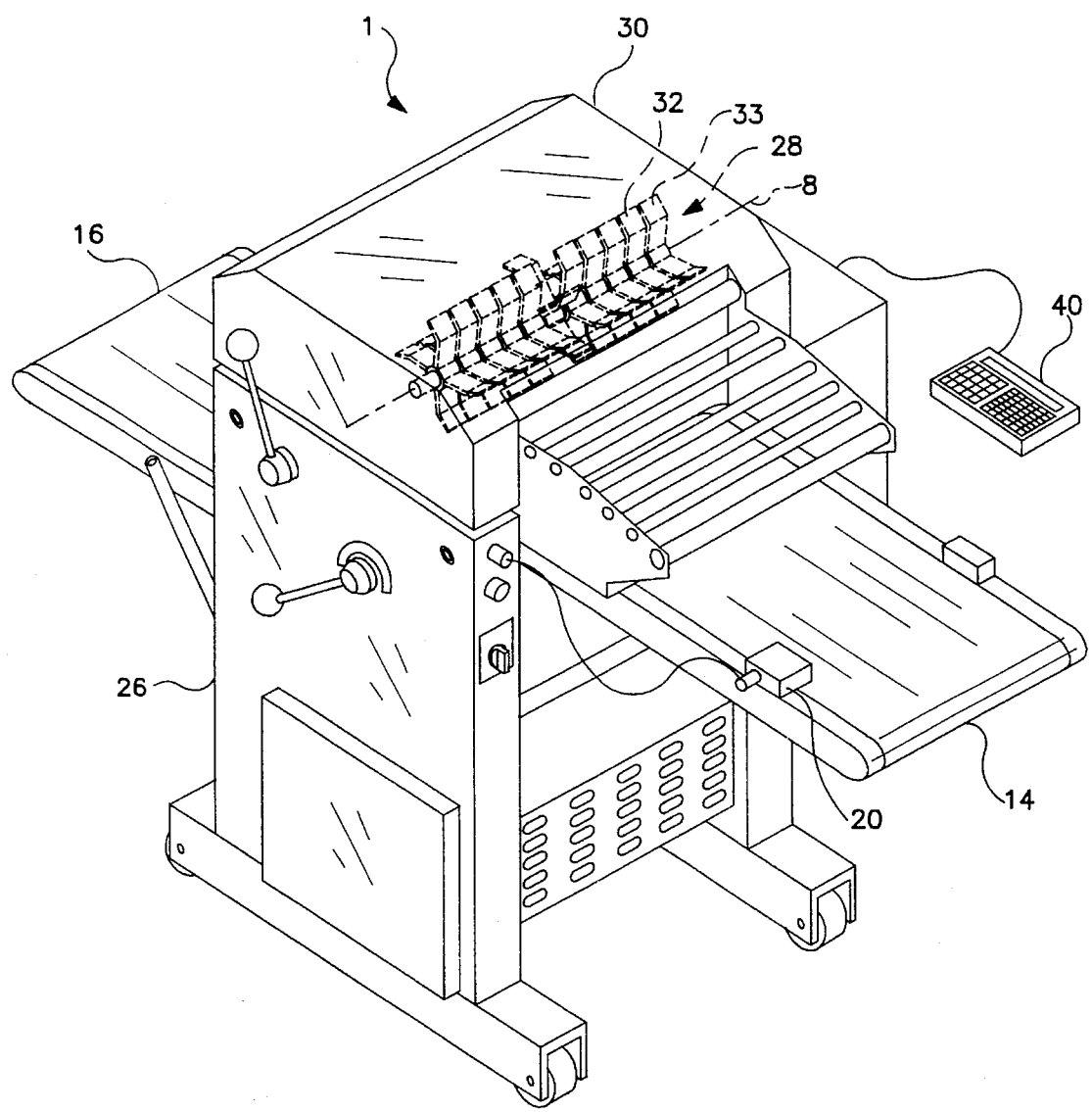

The drawing—FIG. 1 in a perspective view shows an automatic skinning and trimming apparatus 1 with a delivery device 14, which delivers the product to be treated, in particular the piece of meat, to a cutting unit 22 (shown in FIGS. 2 and 3) for skinning and with a discharge device 16 that removes the treated product 36 from the apparatus 1. A sensor 20 is provided on a front end of the delivery device 14. This sensor 20 detects when a further piece of meat 36 is delivered to the skinning apparatus 1. A user operating panel 40 connected to the skinning apparatus 1 allows the user to input various parameters and data for the control unit 100 (shown in FIGS. 2 and 3). In the preferred embodiment, the user operating panel 40 has a sensor keyboard with a liquid crystal display. In an upper part of the skinning apparatus 1, there is also a retaining device 30, which receives a rotary device 28, in particular a pressure roller 28 with flexible prongs 32, which are shown in dashed lines. This retaining device 30 may be completely covered by a hood.

Figure 2:
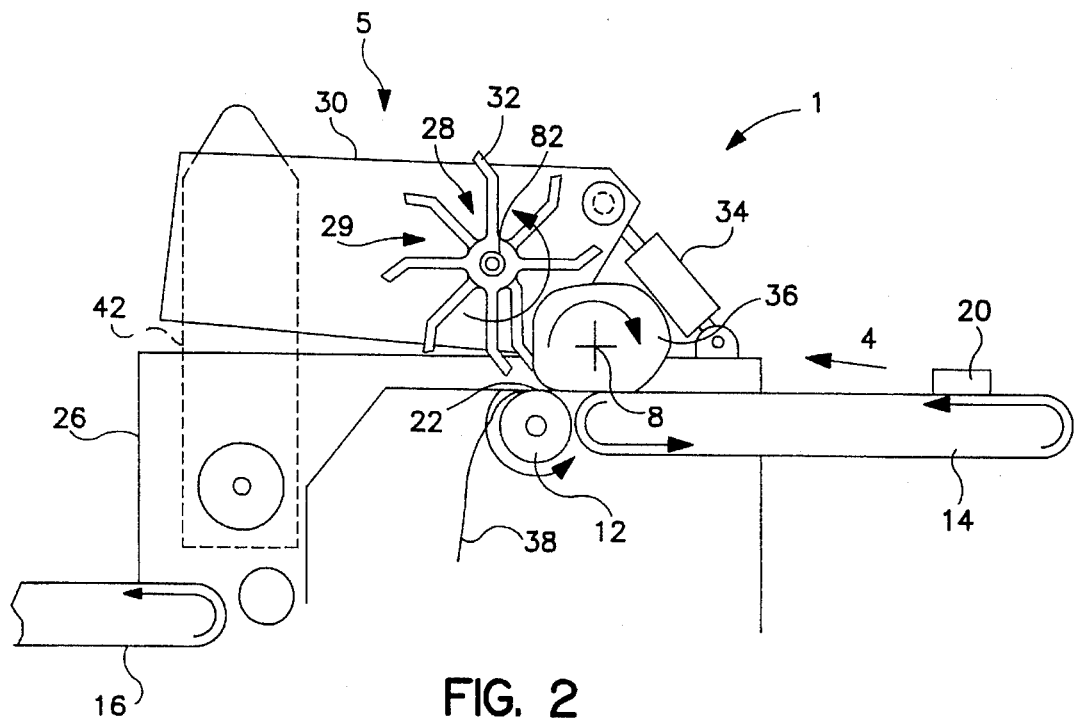

FIG. 2 shows a fragmentary view of the automatic skinning apparatus 1 in its working position 5. The piece of meat 36 is delivered via a delivery device 14 past the sensor 20, the traction roller 12 and the cutting unit 22 for skinning. In the preferred embodiment, the cutting unit 22 is embodied as a cutting blade. It may, however, also be provided that other cutting devices, such as lasers or the like, be used. The pressure roller 28 is positioned above and slightly downstream of the traction roller 12 as viewed in the transport direction 4. In the working position 5, the pressure roller 82 and traction roller 12 have the same direction of rotation. As soon as the piece of meat 36 comes into contact with the traction roller 12, the teeth of the traction roller 12 engage the piece of meat 36 and move it in the transport direction 4, to deliver it to the cutting blade 22.

The pressure roller 28 is provided with a plurality of vane wheels 29 with resilient prongs 32, which in conelike fashion are provided on a number of hubs 82 along an axis, as shown in FIG. 1. The bent disposition of the prongs 32 enables the pressure roller 28 to securely engage the piece of meat 36. In addition, one of the vane wheels 29 is positioned differently from the other vane wheels 29, to promote the skinning of the piece of meat 36. The simultaneous rotation of the pressure roller 28 in combination with the traction roller 12 has the effect that the piece of meat 36 is rotated about a substantially stationary axis. In the process, the cutting blade 22 skins the piece of meat 36, and at the same time the material 38 to be skinned, or its skin, is discharged downward.

The amount of skinned material 38 depends upon the distance between the traction roller 12 and the cutting blade 22, which is multiplied by the number of revolutions of the piece of meat 36. The number of revolutions of the piece of meat 36 is dependent on the circumferential size of the piece of meat 36, the rotary speed of the pressure roller 28 and traction roller 12, and the time within which the piece of meat 36 is skinned by the cutting blade 22. The amount of material 38 to be skinned can be determined by the variation of the speed of the pressure roller 28 and the dwell time of the piece of meat 36 at the cutting unit 22.

Figure 3:
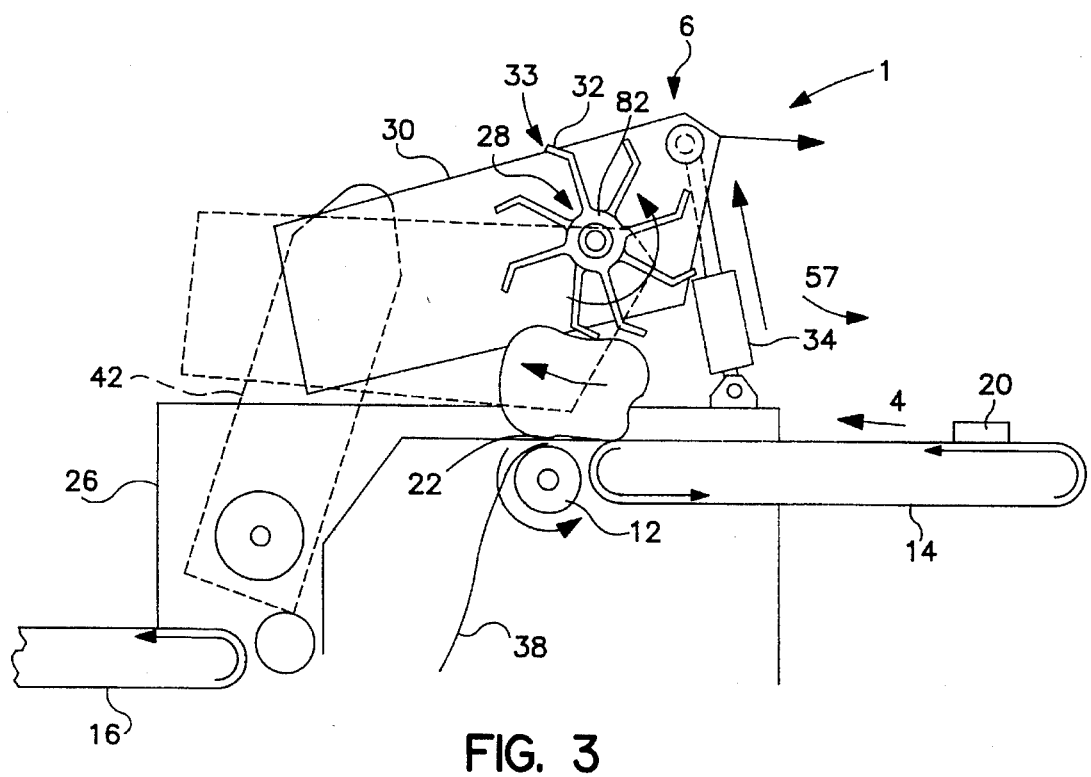

Once the desired amount of material 38 to be skinned has been cut off from the piece of meat 36, the piece of meat 36 is removed from the skinning apparatus 1. The discharging of the piece of meat 36 from the skinning machine 1 is shown in FIG. 3. A retaining device 30 begins with a forward motion, which is contrary to the transport direction 4, while at the same time the pressure roller 28 is stopped. The forward motion of the retaining device 30 has the effect that the piece of meat 36 is pushed in the direction of the arrow 37 and can rest, free of the cutting unit 22, on the inner end of the delivery device 14. At that moment, the pressure roller 28 begins to rotate counterclockwise and migrates across or downstream of the piece of meat 36. In combination with the delivery device 14, the pressure roller 28 engages the piece of meat 36 and moves it in the transport direction 4, through the skinning apparatus 1. In addition, the retaining device moves in a backward direction and in combination with the delivery device 14, pressure roller 28 and traction roller 12, causes the piece of meat 36 to be moved rapidly past the cutting blade 22. Fast removal of the piece of meat 36 from the machine 1 means less further trimming of the piece of meat 36, and a slight removal of material takes place only on its underside. The discharge device 16 carries the piece of meat 36 out of the machine 1. The delivery and discharge device 14 and 16 may advantageously be embodied as conveyor belts.

FIG. 3 also shows that by means of a cylinder unit 34, which may be operated hydraulically with oil but preferably is operated with air, the retaining device 30 can be moved upward and forward. This allows the pressure roller 28 to be suitable for larger pieces of meat 36 and makes it adaptable to various sizes.

As soon as the piece of meat 36 has been removed from the rear part of the skinning apparatus 1 by the discharge device 16, the apparatus 1 is ready to process a new piece of meat 36. The delivery device 14 moves a further piece of meat for skinning past the sensor 20, which resets a control unit 100 and system begins a new operation and moves the retaining device 30 into a working or skinning position 5. Moreover the pressure roller 28, which rotates counterclockwise, is braked and turned clockwise. In the meantime, the following piece of meat 36 is delivered by the delivery device 14 to the traction roller 12, which in combination with the pressure roller 28 puts the piece of meat 36 into engagement with the cutting blade 22 for skinning again and carries out a new skinning operation.

Figure 4:
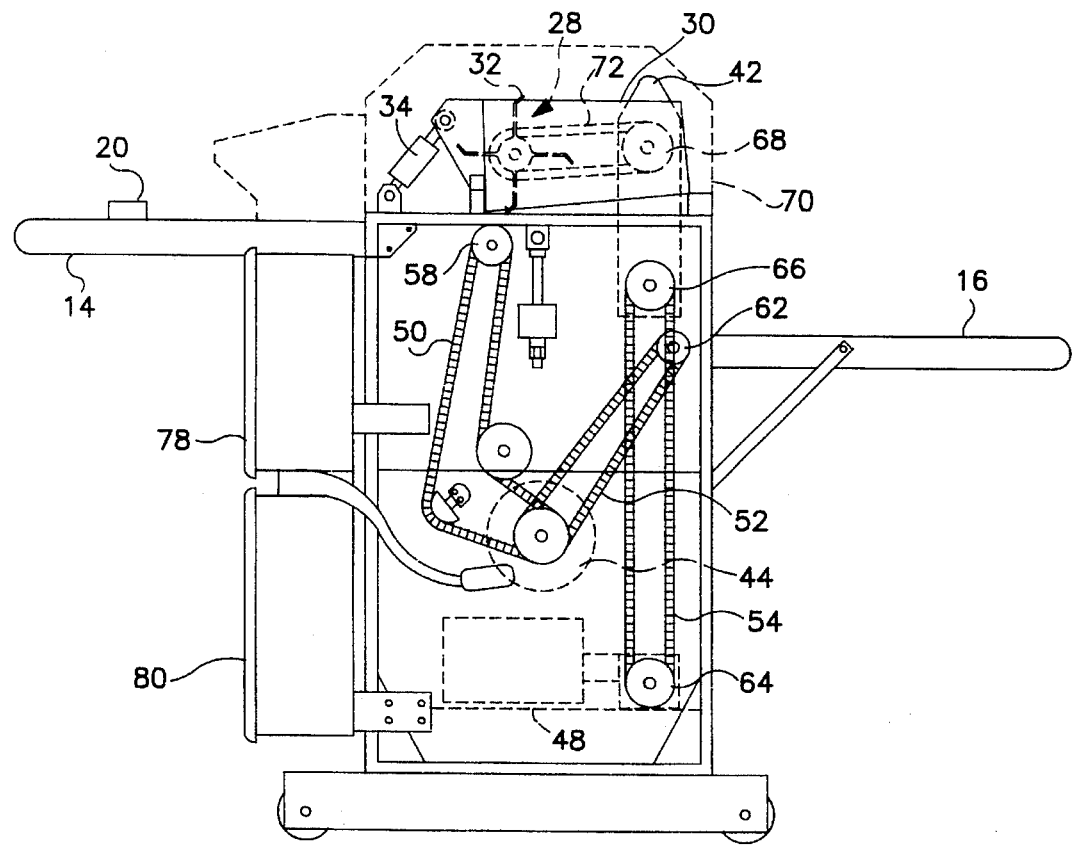
Figure 6:
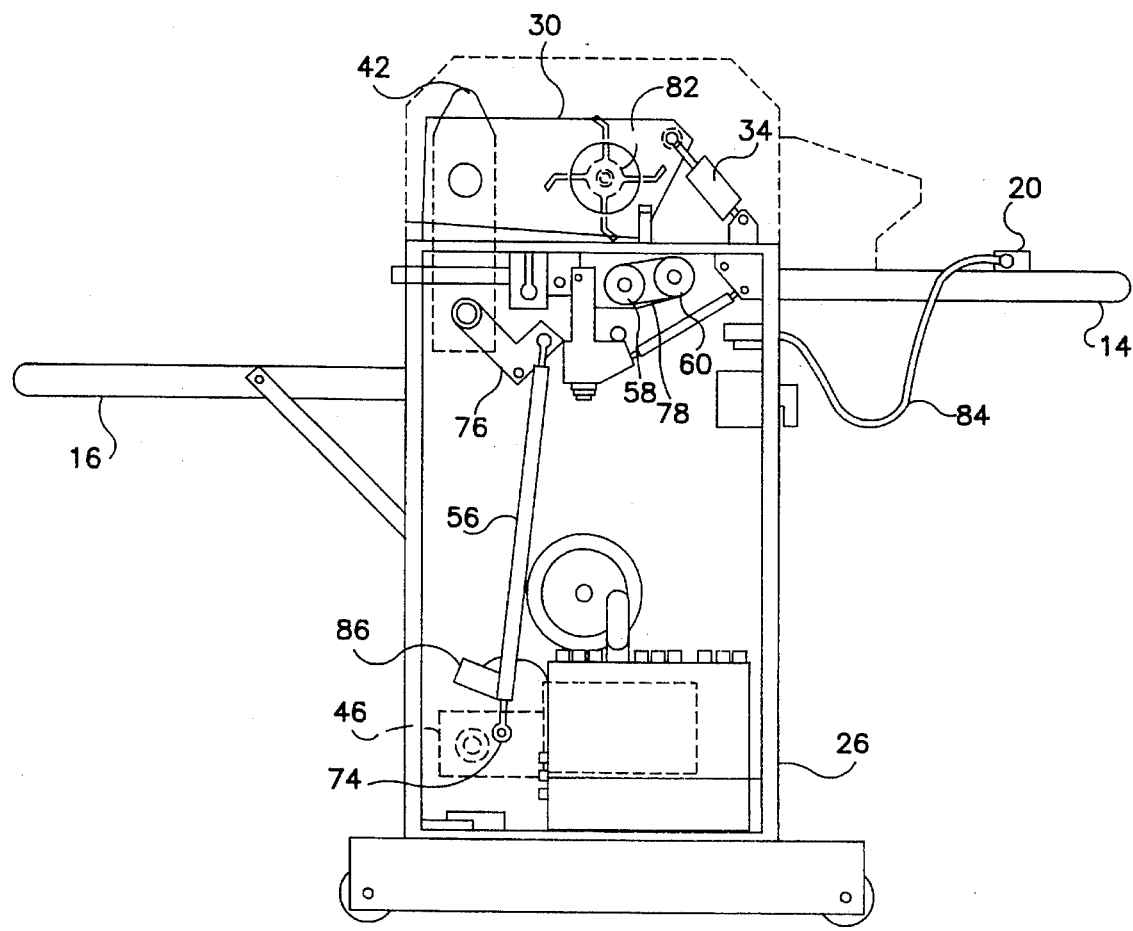

FIG. 4 shows the connection of drive motors with the retaining device 30, delivery device 14, discharge device 16, traction roller 12 and pressure roller 28. A main drive motor 44 is connected to the delivery device 14 by means of a drive chain 50 or gear wheels 58 and 60 (FIG. 6). The main drive 44 also drives the traction roller 12 by means of the drive chain 50 and the gear wheel 58. Moreover, the main drive 44 is responsible for driving the discharge device 16, via a drive chain 2 and a gear wheel 62. In a preferred embodiment, a direct/alternating current motor is provided. Belt drives or the like may also be used.

The pressure roller 28 is driven by a pressure roller motor 48 via drive chains 54, 70 and 72 and via gear wheels 64, 66 and 68. The gear wheel 68 is provided inside the rocker arm 42 of the retaining device 30, and at the same time a horizontal lateral motion in the direction of transport 14 and vertical motion of the retaining device 30 and a rotation of the pressure roller 28 are made possible. The drive motor 48 is adjustable in its speed and can be reversed in its direction of rotation, to enable the working and discharge functions of the pressure roller 28. Various adjustments of parameters also make it possible to adapt in size, type and degree of skinning to the pieces of meat 36.

Figure 5:
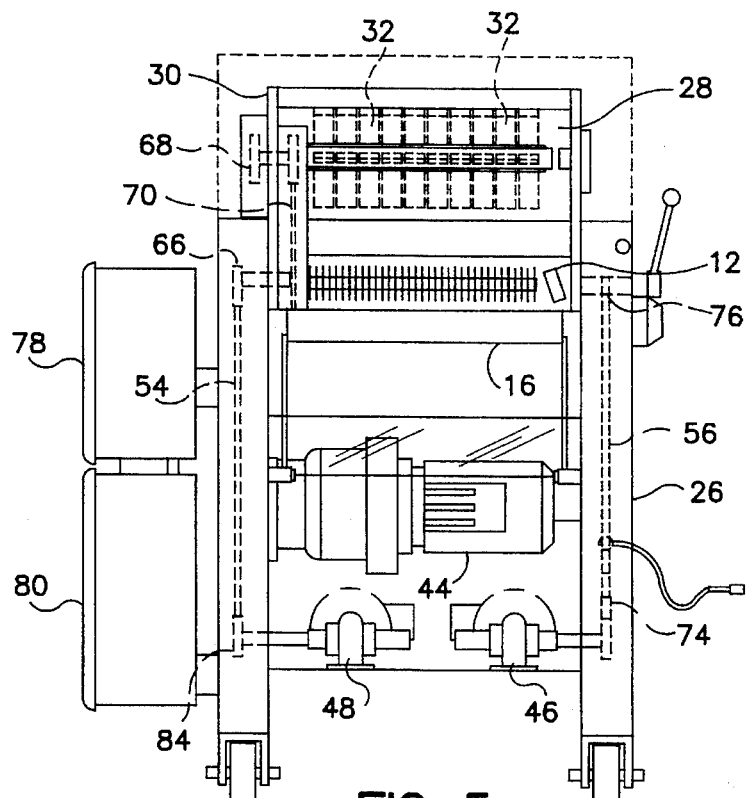

FIG. 5 shows a rear view of the skinning machine 1 with three drive motors 44, 46 and 48. The pressure roller motor 48 is connected to the pressure roller 28 via a transmission device or gear wheels 64, 66 and 68 and their drive chains 54, 70 and 72 (not shown). The drive motor 46 of the retaining device 30 is also shown, which is connected to the control shaft 56 of the retaining device 30 via a pendulum arm 74.

FIG. 6 shows a retaining device 30 connected to the drive members 46, 75, 56, 76. The retaining device 30 is connected to the control shaft 56 via a rocker arm 42 and the connecting lever 70. The control shaft 56 is connected to the drive motor 46 via the pendulum arm 74. The rotation of the motor 46 brings about a rotation of the pendulum arm 74, which transmits this rotation to the control shaft 56 and is moved into an upper or lower position 5 or 6, whereupon the connecting lever 76 is pivoted about a pivot point that actuates the rocker arm 42, as a result of which the retaining device 30 is moved forward or rearward.

Figure 7:
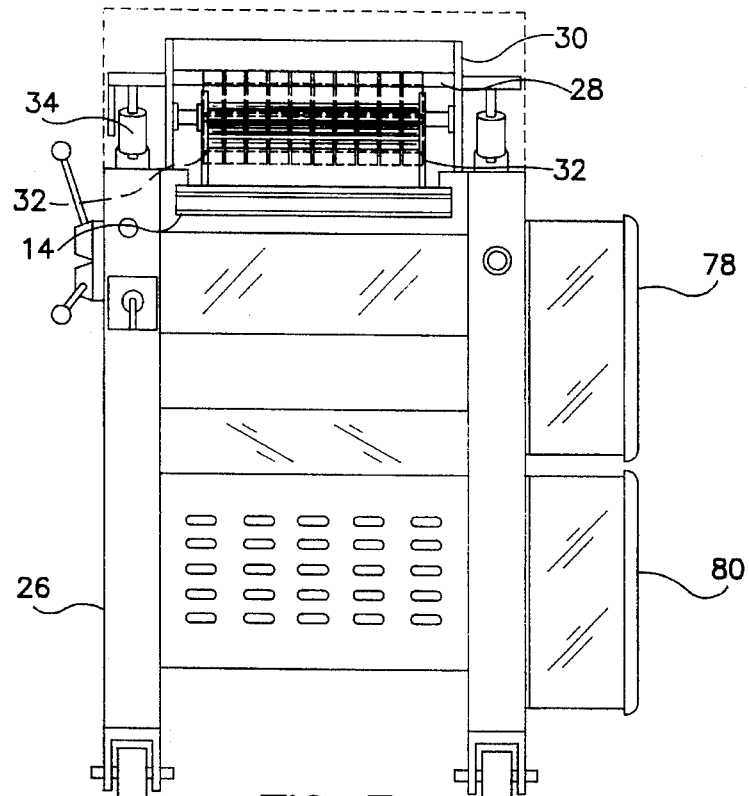

FIG. 7 shows a front view of the skinning machine 1. It shows the retaining device 30, the pressure roller 28 and the flexible prongs 32 thereof, the compressed air cylinder 34 and the delivery device 14. An upper and lower switch box 78 and 80 are provided on one long side of the skinning machine 1 for receiving the control unit 100.

Figure 8:
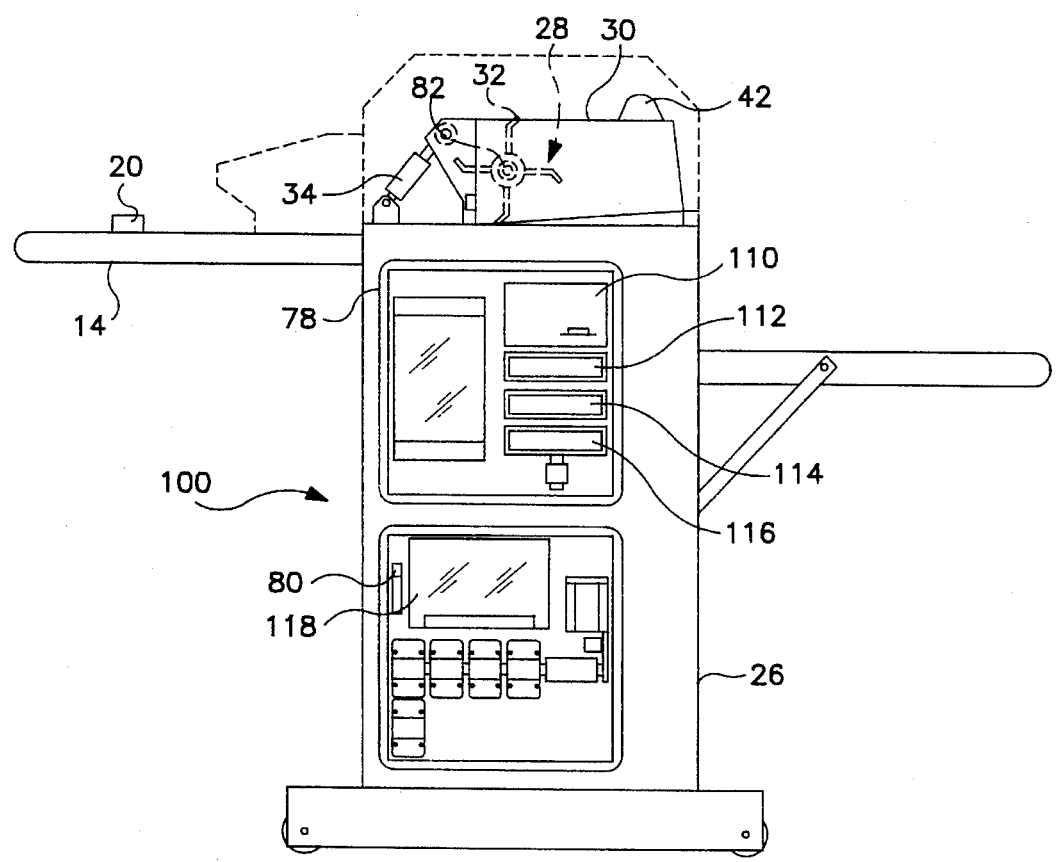

FIG. 8 shows a side view of the switch boxes 78 and 80 with their control unit 100. The control unit can be programmed for the particular operation and adapted to the various sizes of the piece of meat 36 as well as its type and amount of skinning. The control unit 100 includes a central arithmetic unit 110, which is intended to store in memory and process the operating commands. The control unit 100 also includes DC inputs 112, DC outputs 114 and analog outputs 116, all of which are intended to monitor the various sensor arrangements of the skinning apparatus 1, along with inputs and outputs of the central arithmetic unit 110.

The analog output 116 receives control data of the motor from the central arithmetic unit 110 and transmits these data to a voltage regulator 118. The voltage regulator 118 converts these data, which are used to monitor the speed and direction of rotation of the pressure roller motor 48.

The central arithmetic unit 110 is connected to the user operating field 40. This field can receive various inputs of the parameters in terms of different pieces of meat 36 and carry them on to the central control unit 100. A plurality of parameters are used by the control unit 100 to adapt the processing by the skinning machine 1 to the correspondingly different pieces of meat. This means the following: the length of time that the pressure roller 28 rotates the piece of meat 36 while it is being skinned by the cutting blade 22; the length of time that the retaining device 30 is in the forward discharge position 6; the operating position 5 of the retaining device 30 during the skinning; the forward and reverse rotary speed of the pressure roller 28; and the length of time that the pressure roller 28 is kept in rotation for discharge purposes.

In a preferred embodiment, these inputs are made by the user via the operator control panel 40 and may be adapted to the various requirements in terms of the piece of meat 36. Provision is also made to enable various data to be adjusted automatically by additional sensors in order to enable further automation of the process. Hence the inputs required by the user can be limited to a minimum or even be dispensed with. For instance, a sensor may be provided that determines the size of the piece of meat 36 while the meat is being delivered to the cutter unit 22 by the delivery device 14. The control unit 100 can convert these data and adjust the requisite parameters. In addition a sensor may be used to determine the mount of material 38 to be skinned, so that the parameters relating to it can be adjusted analogously. One important function of the operator control panel 44 and the control unit 100 is to monitor the various sensors within the skinning machine 1. Many of the sensors are provided to detect errors and for safety of the machine 1; if an error is reported, they interrupt the power supply to the skinning machine 1. These errors are displayed in a display of the user control panel 44. Some of the sensors that are monitored by the control unit 100 are for instance cleaning brushes present, covering present, motor overloaded, and supply voltage present. In addition the control unit 100 may monitor a plurality of motion sensors, such as the retaining device sensor 86, which indicates whether the retaining device 30 is in a rear working position 5 or a front discharge position 6. Moreover, monitoring of the position detection sensor 20 is provided, in order to determine when the sequence over time of processing steps for skinning can be started.

Figure 9:
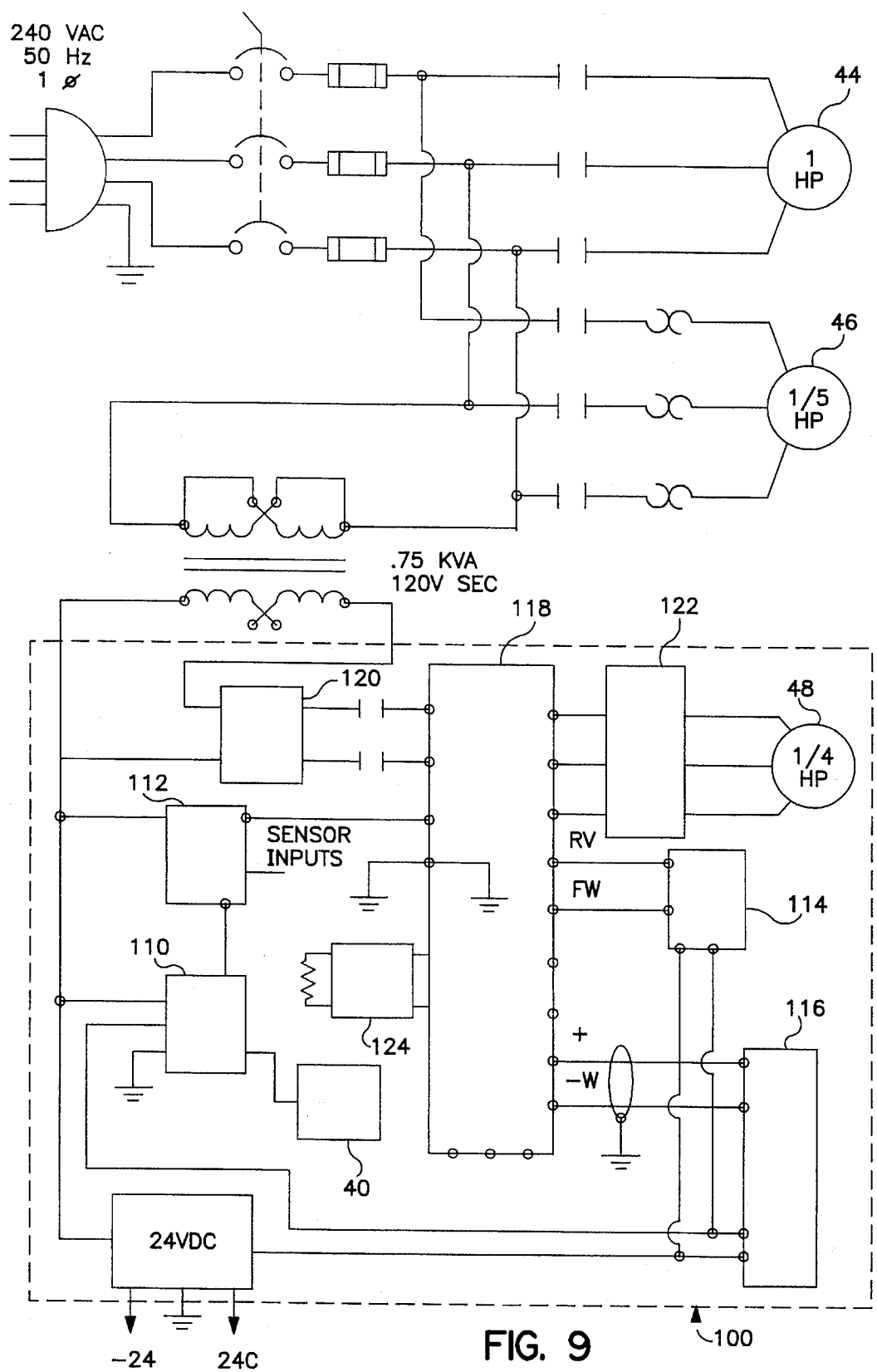

FIG. 9 shows a schematic circuit arrangement of the control unit 1 and its connection with the user operating panel 44 and the control motors 40, 46 and 48. The core of the control unit 100 is the central arithmetic unit 110, which is connected to the user operating field panel 40, DC input 112, DC output 114, and the analog output 116. The interaction between the user and the control unit 100 takes place through the user operating panel 40, which is electrically connected to the central arithmetic unit 110. The user can input various parameters, which relate to a piece of meat to be skinned, via the user operating panel 40, which converts the data and transfers them to the central arithmetic unit 110 for processing the data. The central arithmetic unit 110 also receives various alarm parameters from the DC input 112, in order to check whether the skinning machine 1 is in a safe operating condition, before the data are further processed. The central arithmetic unit 110 then processes the data input by the user and calculates the suitable rotary speed, the position of the retaining device 30, and the like, and sends these data to the analog output 116. The analog output 116 in turn sends these data to the voltage regulator 118, which converts the data into various voltages for controlling the motors. The current is variable by the central arithmetic unit 110 as a function of the desired rotary speed of the motor. This current may be converted into various voltages by the voltage regulator 118 and applied to the pressure roller motor 48. Additionally, the central arithmetic unit 110 is connected to the DC output 114, which is also connected to the voltage regulator 118. The DC output 114 is used to monitor the direction of rotation of the pressure roller motor 48.

The schematic circuit arrangement of FIG. 9 shows a filter for the power supply 120, a phase/grounding error detector 122 and a dynamic interruption module 124. The filter is provided for filtering the supply voltage of the pressure roller motor 48. The phase/grounding error detector 122 is disposed between the pressure roller motor 48 and the voltage regulator 118 and turns off the voltage to protect the two parts if a short circuit occurs. Finally, the interruption module 124 is connected to the voltage regulator 118 and can protect it against current peaks that may result from the change in direction of rotation of the pressure roller motor 48.

In the preferred embodiment, the skinning begins as soon as the meat product 36 has moved past the sensor 20. At that moment the control unit 100 initiates operation of the entire system for resetting all the parameters to their initial values. The retaining device 30 assumes the starting/working position 5 (FIG. 2), while the delivery device 14 transports the piece of meat 36 to the traction roller 12 and the pressure roller 28. As soon as the piece of meat 36 has reached the cutting blade 22, the pressure roller 28 engages the piece of meat 36 and imparts an impulse upward and counter to the transport direction 4. The traction roller 12, which moves the piece of meat 36 on its underside in the transport direction 4 to the cutting blade 22, imparts an impulse in the transport direction to the piece of meat 36. The cooperation of these force factors means that the piece of meat 36 rotates essentially about a stationary axis, or the longitudinal axis of the piece of meat 36 itself, above the knife 22. In addition, the piece of meat 36 is in constant contact, by its own weight, with the cutting blade 22, and as a result a small amount is trimmed from the piece of meat 36, the amount being equivalent to the distance between the cutting blade 22 and the traction roller 12. Moreover, the amount of material cut off is dependent on the number of revolutions of the piece of meat 36 during the time it is in contact with the cutting blade 22. This depends on the rotary speed and on the length of time during which the piece of meat 36 rotates. Both parameters can be input by the user and changed at any time. As soon as the time for rotation of the pressure roller 28 has elapsed, the retaining device 30 is moved forward and the pressure roller 28 is thus stopped counter to the transport direction 4, and the piece of meat 36 is removed from the cutting blade 22. The pressure roller 28 begins to rotate in the opposite direction. Since the delivery device 14 is activated upon the transport of the piece of meat 36 toward the pressure roller 28, and the retaining device 30, via the cylinders 34 and the rocker arms 42, has been moved upward substantially opposite the transport direction 4, the pressure roller 28 can re-engage the piece of meat 36. Because of the pivotable support on the rocker arm 42, the pressure roller 28 can migrate over the piece of meat and impart an impulse in the transport direction 4. At the same time, the retaining device 30 is moved in the transport direction 4 and past the cutting blade 22. On the transport device 16, the processed piece of meat 36 is taken out for removal from the skinning machine 1.

Figure 10:
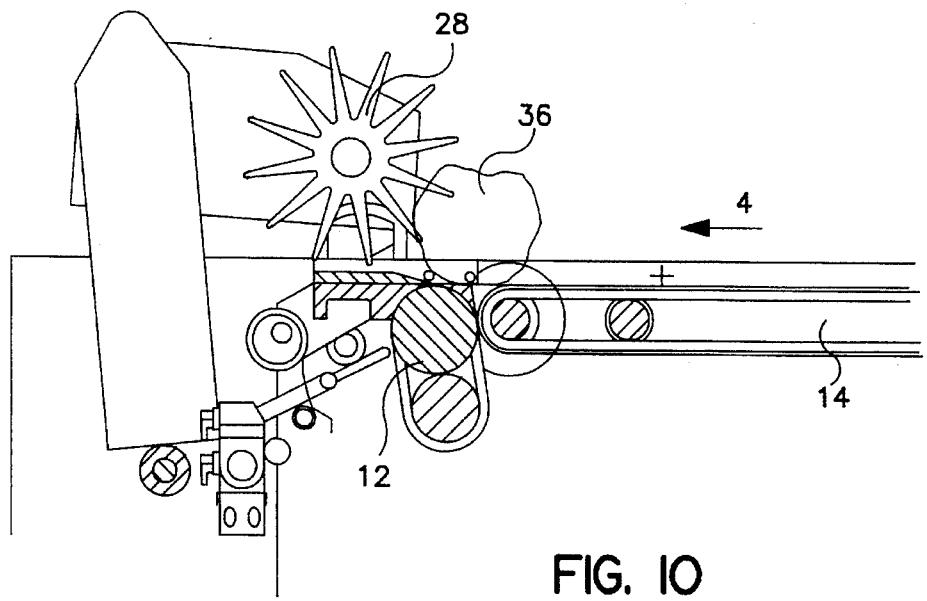
Figure 11:
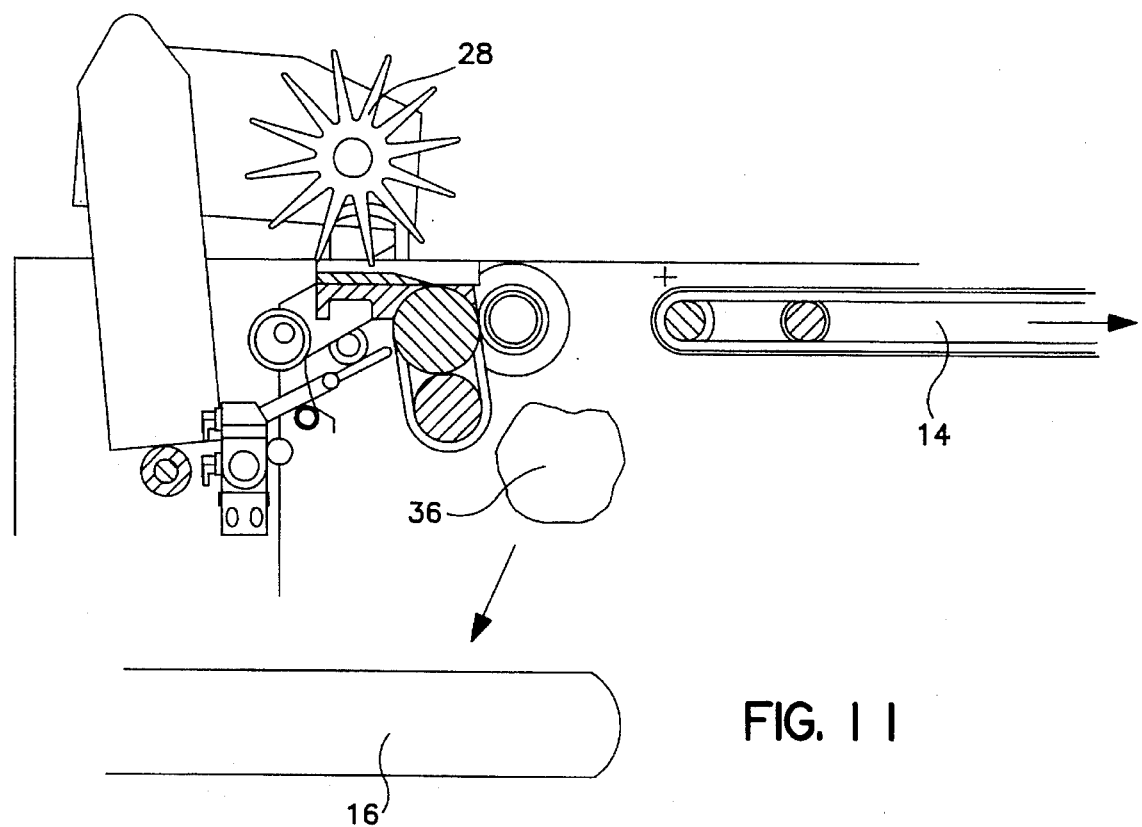

FIGS. 10 and 11 illustrate a product skinning device in which the product is advanced to the cutter by the delivery device 14, the product is skinned as set forth above, and then the delivery device is moved away from the cutter thereby providing a space between the cutter and the delivery device through which the product can be dropped as shown in FIG. 11. The discharge device 16 is shown below the opening so that the product will fall on the delivery device for delivery to another treating station.

All the characteristics in the specification and ensuing claims and shown in the drawing may be essential to the invention either individually or in any arbitrary combination with one another.

I claim:

1. A method for skinning and trimming a product to be treated in a skinning machine (1) which comprises placing a product (36) to be treated on a delivery device (14) and delivering the product in a transport direction (4) to a traction roller (12), transporting the product (36) to a cutting unit (22) by the traction roller (12) engaging the product, and rotating the product (36) to be treated, for skinning, at the cutting unit (22) by at least one rotary device (28) rotating about an axis (8) extending substantially parallel to the traction roller (12), discharging the product (36) by moving the delivery device (14) far enough counter to the transport direction (4) that the product (36) is dropped downward between the cutting unit (22) and the delivery device (14), and returning the delivery device (14) to its outset position.

2. A method as defined by claim 1, in which the product (36) to be treated for discharge, is removed from its position at the cutting unit (22) by an arm.

3. An apparatus for skinning and trimming a product to be treated, such as pieces of meat or fish or the like, having a base frame (26), a cutting unit (22) and a traction roller (12), which are provided on the base frame (26), a delivery device (14) that delivers the product (36) to be treated to the traction roller (12), and a retaining device (30) that is movably provided on the base frame (26), a rotary device (28) is disposed on the retaining device (30) and cooperates with the traction roller (12) to rotate the product (36) to be treated in an axis (8) relative to the cutting unit (22), for processing the product (36) to be treated, the delivery device is disposed directly upstream of the cutting unit (22) in terms of the transport direction, and that for discharging the product (36), the delivery device (14) is moved toward the delivery direction and positioned such that a distance exists between the cutting unit (22) and the delivery device (14) that is greater than the dimensions of the product (36) so that the product is dropped downwardly between the cutter and an adjacent end of the delivery device (14).

4. An apparatus as defined by claim 3, in which an arm serving the purpose of discharge is disposed above or downstream, in terms of the transport direction (4), of the rotary device (28) and removes the product to be treated laterally from its position at the cutting unit.

5. An apparatus as defined by claim 3, in which the retaining device (30) on which the rotary device (28) is disposed is associated with the cutting unit (22) independently of the base frame (26).

6. An apparatus as defined by claim 5, in which the rotary device (28) is embodied as a linear unit.

7. An apparatus as defined by claim 6, in which at least one linear unit (28) is embodied with at least one engagement device having a front engagement edge (33).

8. An apparatus as defined by claim 6, in which the linear unit (28) is movable on the retaining device (30), in particular being pivotably disposed, in the working and discharge positions (5, 6).

9. An apparatus as defined by claim 7, in which the linear unit (28) is movable on the retaining device (30) and is pivotably disposed, in the working and discharge positions (5, 6).

10. An apparatus as defined by claim 7, in which at least one linear unit (28) is disposed with a front engagement edge (33) capable of engagement with the product (36) to be treated, which edge preferably has a hook-shaped course for rotating the product (36) to be treated about the axis (8).

11. An apparatus as defined by claim 7, in which the engagement device is interchangeably disposed on the linear unit (28).

12. An apparatus as defined by claim 7, in which the engagement device is embodied in comblike fashion and is provided on its free ends with the front engagement edge (33), and that at least two intermeshing comblike engagement devices of linear units (28) are movable contrary to one another.

* * * * *